United States Patent

[11] 3,540,482

[72] Inventor Keith H. Fulmer
 South Bend, Indiana
[21] Appl. No. 670,191
[22] Filed Sept. 25, 1967
[45] Patented Nov. 17, 1970
[73] Assignee The Bendix Corporation
 a corporation of Delaware

[54] ACCUMULATOR INLET FITTING
 5 Claims, 2 Drawing Figs.
[52] U.S. Cl. ................................................ 138/30
[51] Int. Cl. ........................................... F16l 55/04
[50] Field of Search ............................. 138/30, 44;
 137/(Inquired); 251/353, (Inquired); 92/
 (Inquired); 222/(Inquired); 181/(Inquired);
 267/(Inquired)

[56] References Cited
 UNITED STATES PATENTS
 2,501,593 3/1950 Becker ..................... 138/44
 2,932,322 4/1960 Mercier .................... 138/30
 3,181,555 5/1965 Jacobson .................. 251/353X Primary Examiner—Houston S. Bell, Jr.
Attorney—Richard G. Geib and Plante, Arens, Hartz and O'Brien ABSTRACT: A control for reducing noise and fluid pulsations through an accumulator in a hydraulic system. The shell of the accumulator is divided into gaseous and hydraulic chambers by a bladder member secured to the end closure member of the shell. A housing having a fixed volume chamber interconnecting separate inlet and outlet ports in communication with the hydraulic fluid in the system is connected to the accumulator shell adjacent the hydraulic chamber. The hydraulic chamber is connected to the fixed volume chamber by a plurality of passages surrounding a central opening. An antiextrusion plate overlying the plurality of passages is secured to the central opening by a spreadable fastener. Hydraulic fluid from the inlet port is received in the fixed volume chamber where the direction of the flowing fluid is interrupted due to the size of the chamber and the separate outlet port. From the fixed volume chamber the hydraulic fluid flows through the plurality of passages where radial notches in the antiextrusion plate directs the flow toward the bladder member which dampens the pulsations and absorbs the noise carried by the fluid in the system.

Patented Nov. 17, 1970

3,540,482

INVENTOR.
KEITH H. FULMER
BY
Richard G. Geib
ATTORNEY

3,540,482

ACCUMULATOR INLET FITTING

SUMMARY

Accumulator type means have long been recognized as not only providing the function of storage of pressurized fluid, but because of the resiliency within the accumulator as a means to decrease the effect of pulsations in a hydraulic system. However, little attention has ever been given to providing an association with these advantageous features of the accumulator, a means for separating the inlet and outlet flow through the accumulator such that the pulsations and the attendant noise thereof within the hydraulic system are left behind at the accumulator and not carried by the system to the control valve.

It is the principal object of this invention to provide an inlet fitting for an accumulator which eliminates the problem not only of pulsations, but noise in the hydraulic system utilizing a piston pump as a pressure source.

DRAWING DESCRIPTION

FIG. 1 is a schematic illustration of a hydraulic power braking system in which an accumulator in accordance with the principles of this invention may be utilized; and FIG. 2 is a cross-sectional detail of an accumulator having an inlet fitting in accordance with the principles of this invention.

DETAILED DESCRIPTION

Figure 1:
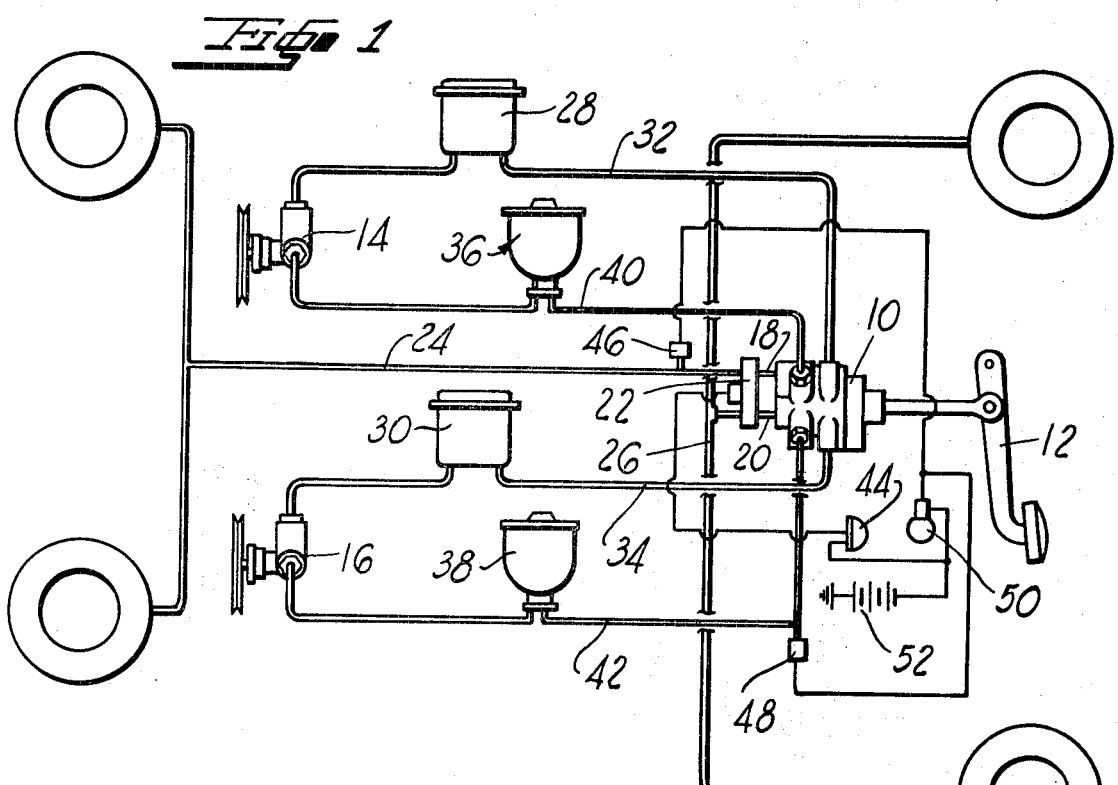

Referring now to FIG. 1 there is shown a power braking system incorporating features in line with the safety requirements of the industry today. More particularly, there is shown a power brake control valve 10 whose construction details may be observed in application Ser. No. 603,851, filed Dec. 22, 1966 and assigned to the common assignee, which is actuatable by a brake pedal 12 to deliver a pressurized fluid as provided by pumps 14 and 16 by way of separate conduits 18 and 20 to a failure warning switch 22 and thence by conduits 24 and 26 to the vehicle's front brakes and rear brakes, respectively.

As seen, the pumps 14 and 16 draw fluid from separate reservoirs 28 and 30 that are in turn connected by return lines 32 and 34 to the power brake control valve 10. The fluid from the pump first passes into accumulators 36 and 38 and out of accumulators by way of conduits 40 and 42 to the pressure inlets of the control valve 10. Thus, whenever the brake pedal 12 is depressed within the operator's compartment, the brake valve 10 will schedule the pressure flow to the front and rear brakes. If, per chance, a failure in one or the other of the front or rear brake system occurs, the warning switch 22, which may be of the type shown in U.S. Pat. No. 3,228,194 assigned to the common assignee of this invention, will activate a brake warning light 44. In addition, stoplight switches 46 and 48 are activated whenever control pressure is delivered from the control valve 10 to illuminate the stoplight bulbs 50 of the vehicle tail lights, which like the brake warning indicator 44 is interposed in an electrical circuit between the vehicle battery 52 and the ground connection to the indicator 44 at bulbs 50.

Figure 2:
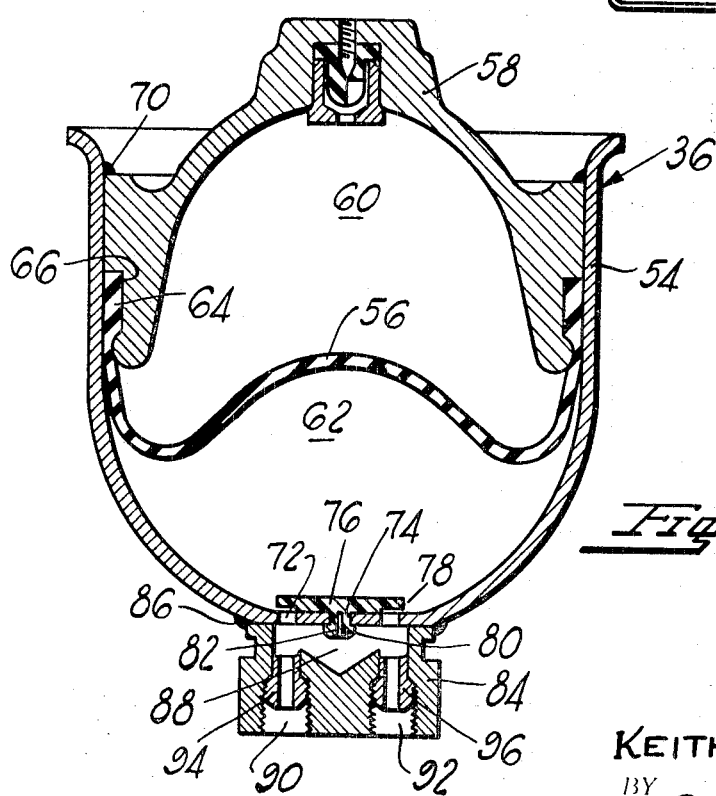

With reference now to FIG. 2, the accumulator 36 is shown in cross-sectional detail to comprise a shell 54 within which a bladder 56 is positioned by an end structure 58 so as to provide a gas chamber 60 and a hydraulic chamber 62. As seen, the end structure 58 and the bladder 56 are a subassembly in that the bladder is molded with a bead 64 fitting within a recess 66 of the end structure 58. After insertion into the shell 54, the end structure is welded as at 70 to the mouth of the end structure to hold the assembly. However, prior to the insertion of the end structure subassembly, the shell 54 is drilled to provide a plurality of passages 72 about a centrally drilled opening, as at 74. After the drilling operation, the Delrin plate or similarly hard plastic plate 76, having radial notches 78, is assembled to the shell 54 by snap fitting its depending projection having a bulbous end 80 through the central opening 74.

In order to get the desired fastening action, the hard plastic plate 76 is relieved as at 82 so that the bulbous end 80 may pass through the opening 74 and spread on the other side of the shell 54 to join plate to the shell. The radial notches change the direction of flow through passages 72 to follow the inner walls of the shell 54 to permit fluid exposure to a greater area of the bladder than if straight in.

Thereafter, the subassembly of the end structure 58 in the bladder 56 are assembled to the shell 54 and the weld 70 is performed at the mouth of the shell.

Prior to this, however, a fitting housing 84 is assembled to the shell 54, as by a bead of a weld 86 about the periphery of the fitting 84, exteriorly to the openings 72. By accomplishing the weld 86 prior to assembly of plate 76, heat of the weld will not damage the plate. This fitting is constructed to have a chamber 88 immediately underlying the passages 72 of the shell 54. The housing is provided with parallel ports 90 and 92 having press fitted therein ferrules 94 and 96 which underlie threads about the ports 90 and 92 for assembly of the conduits from the pump and leading to the control valve. The housing is further provided with a conically-shaped depressed area which forms the portion of the housing 84 located between the inlet and outlet ports 90 and 92, respectively.

With the accumulator design, and especially the design of the housing 84 and antiextrusion plate 76, the pulsating pressure from the pumps 14 and 16 are introduced via the port 90 to the chamber 88 and by way of the passages 72 to the bladder 56 causing it to rise to the position shown in FIG. 2 after sufficient pressure has been developed by the pumps 14 and 16. Thus, there is an interruption in the direction of fluid flow from the pumps to the control valve 10, and the pulsating fluid is readily introduced to a larger area of the bladder 56 than in designs heretofore observed in the prior art whereby pulsations and/or noise is absorbed.

Having fully described an operative construction of my invention and its commercial utility, it is now desired to set forth the intended protection sought by these letters patent in the appended claims as follows:

I claim:

1. For use with an accumulator, a fluid inlet fitting permitting the accumulator bladder to absorb sounds of the fluid system and pressure pulsations, said fitting comprising:

a housing having separate inlet and outlet ports being interconnected by a chamber, said chamber being open opposite said inlet and outlet ports communicating thereinto; and means joining said housing to the accumulator registering the open portion of said chamber with openings in a shell of the accumulator adjacent the bladder thereof, said openings being a plurality of radial passages around a central opening, said inlet and outlet ports being aligned with said radial passages while the central opening receives a spreadable fastener securing an antiextrusion plate to said shell, said antiextrusion plate having radial notches overlying said radial passages to protect said bladder while permitting the fluid flow from the inlet port to the outlet port to maintain exposure to said bladder within said accumulator.

2. In a hydraulic system, a noise and fluid pulsation reducing means, said means comprising:

a shell member with a plurality of passages surrounding a central opening;

a conical end section secured to said shell, said end section being connected to a source of pressurized gas;

bladder means sealed to said end section dividing said shell into gaseous and hydraulic chambers;

an external projection surrounding said plurality of passages, said external projection having a fixed volume chamber, said chamber having separate inlet and outlet ports in communication with the hydraulic fluid in said system, said chamber changing the direction of fluid flow from said inlet to outlet port; and means in said hydraulic chamber for directing the fluid flowing from said fixed chamber through said plurality of passages toward said bladder means, where said bladder means dampens the pulsations and absorbs the noise carried in said hydraulic system.

3. In a hydraulic system, as recited in claim 2, wherein said means in said hydraulic chamber includes, an antiextrusion plate fixed in said central opening and having radial notches overlying said plurality of passages for directing the flow of fluid in the same manner under all pressures.

4. In the system, recited in claim 2, wherein the means for directing the flow of fluid includes, radially spaced notches surrounding a central opening in the housing of the hydraulic chamber, said central opening receiving a spreadable fastener of an antiextrusion plate, said antiextrusion plate being fixed and overlying said plurality of passages for directing the flow of fluid in the same manner toward the bladder member at all pressures.

5. In the system, recited in claim 4, wherein said plate has a bulbous end which is snapped into said central opening fixing said plate to said housing.